Figure 1:
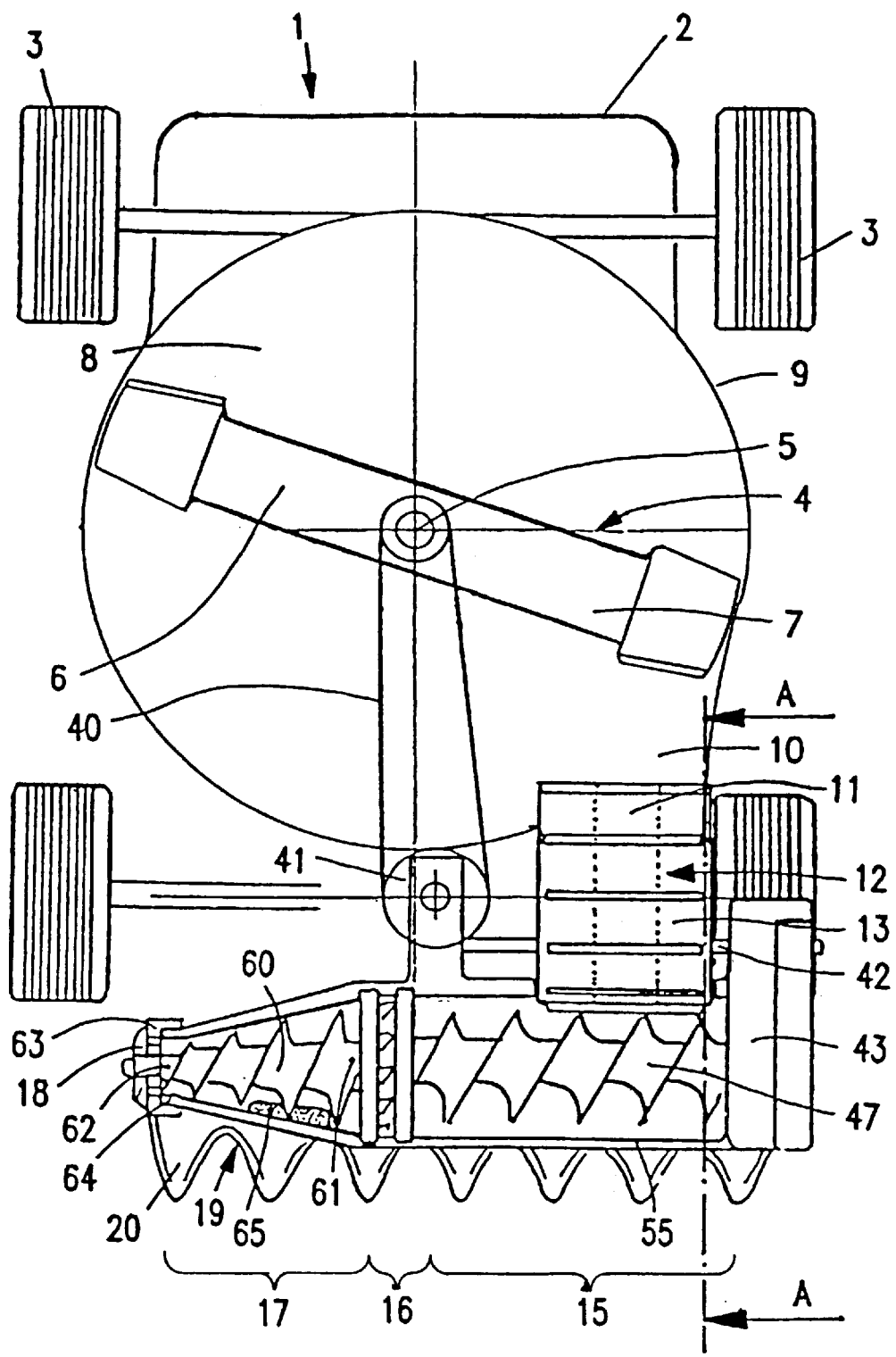

United States Patent
Specht et al.

[11] Patent Number: 6,016,644
[45] Date of Patent: Jan. 25, 2000

[54] METHOD OF MOWING MEADOWS, METHOD OF COMPOSTING GRASS CUTTINGS, A MOWING MACHINE AND DEVICE FOR PROCESSING GRASS CUTTINGS

[75] Inventors: Martin Specht, Feldafing; Horst Wilfried Ball, Dingolfing; Martin Diez, München; Thomas Haselbach, Feldafing, all of Germany

[73] Assignee: Zuendapp Gartentechnik GmbH & Co. Entwicklungs KG, Wessling, Germany

[21] Appl. No.: 08/913,777

[22] PCT Filed: Mar. 27, 1996

[86] PCT No.: PCT/EP96/01344

§ 371 Date: Sep. 23, 1997

§ 102(e) Date: Sep. 23, 1997

[87] PCT Pub. No.: WO96/29854

PCT Pub. Date: Oct. 3, 1996

[30] Foreign Application Priority Data

Mar. 27, 1995 [DE] Germany .............. 195 11 217

[51] Int. Cl.$^7$ .................................................. A01D 43/00
[52] U.S. Cl. .................................................. 56/1; 56/16.9
[58] Field of Search ................ 56/1, 16.9, 16.4 R, 56/16.4 A, 16.8, 13.3, 202, DIG. 1, DIG. 2, 320.1, 320.2

[56] References Cited

U.S. PATENT DOCUMENTS

| 3,846,963 | 11/1974 | Pedigo . |
| 4,109,448 | 8/1978 | Kline . |
| 4,379,385 | 4/1983 | Reinhall ........................ 56/16.9 X |
| 5,435,118 | 7/1995 | Cobile .......................... 56/16.9 X |

FOREIGN PATENT DOCUMENTS

| 0422624 | 4/1991 | European Pat. Off. . |
| 0526763 | 2/1993 | European Pat. Off. . |
| 90558 | 1/1968 | France . |
| 2496392 | 6/1982 | France . |
| 4 311 343 | 10/1994 | Germany . |
| 43 32 430 | 3/1995 | Germany . |
| 613842 | 10/1979 | Switzerland . |

*Primary Examiner*—Robert E. Pezzuto
*Attorney, Agent, or Firm*—Evenson McKeown Edwards & Lenahan PLLC

[57] ABSTRACT

The invention concerns a method of mowing meadows and the like, a method of composting cuttings, a mowing machine and a cuttings processing apparatus. A mowing machine according to the invention includes a driven rotating cutting member 4, a cuttings conveyor device 12 for transporting the cuttings into a compacting device 15, a chopping device 16 for the cuttings, a subsequent dehydrating device 17 and a liquid collecting and discharging device 19, 20 for the liquid extracted from the cuttings in the dehydration procedure.

9 Claims, 17 Drawing Sheets

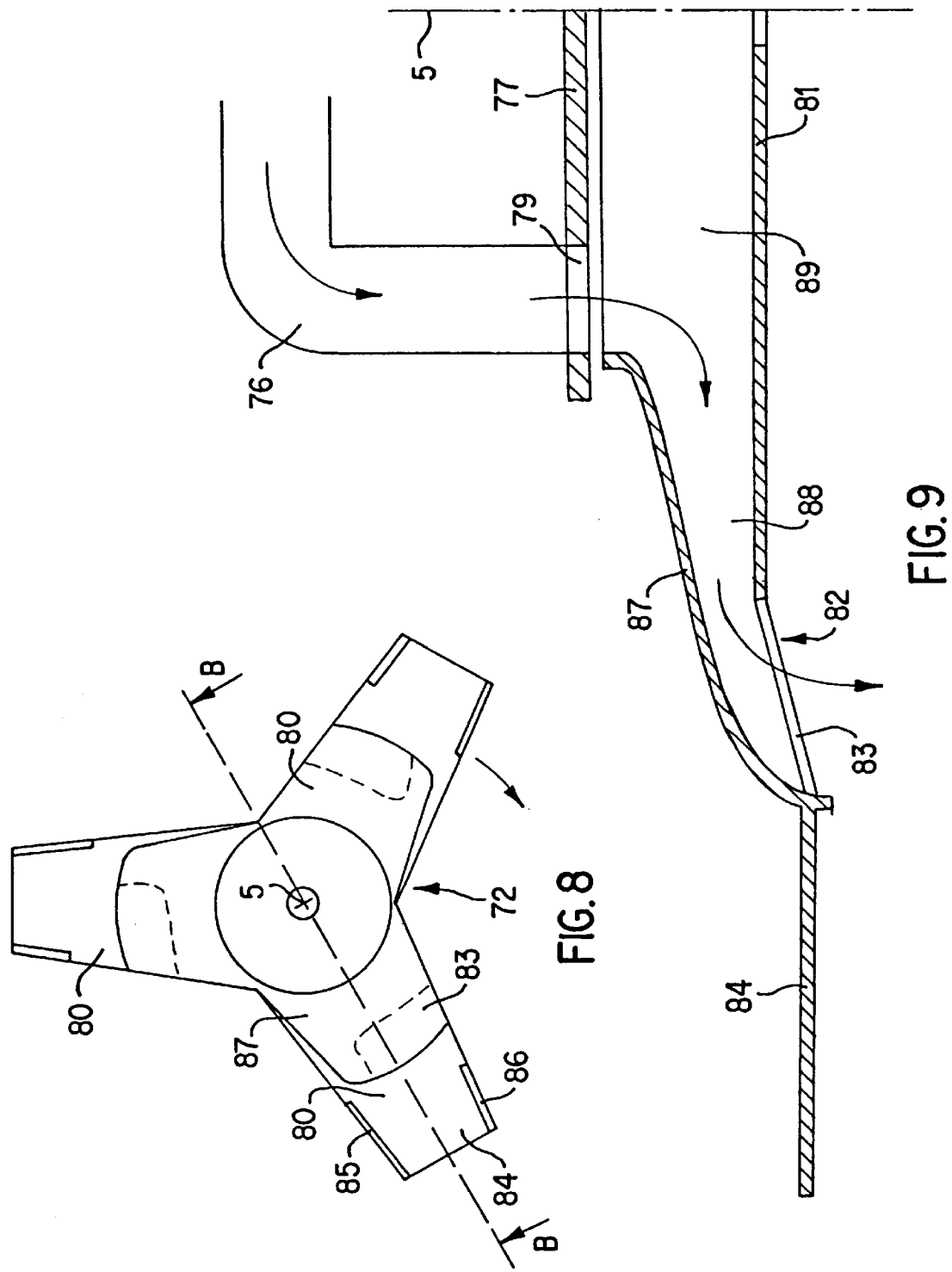

METHOD OF MOWING MEADOWS, METHOD OF COMPOSTING GRASS CUTTINGS, A MOWING MACHINE AND DEVICE FOR PROCESSING GRASS CUTTINGS

The invention concerns a method of mowing meadows and the like, a method of composting cuttings, a mowing machine and a cuttings processing device.

It is known when mechanically mowing meadows, garden lawns or the like, for the plant vegetation and in particular grass to be cut down and for the cuttings to be left to lie on the ground as fertilizer. On the other hand the cuttings can also be collected up in an additional working operation or collected in a catch device immediately after the cutting operation and thus removed from the lawn. In that case however the cuttings are withheld from the lawn as a valuable fertilizer (for example upon central composting).

In the case of lawn mowers which are conventional at the present time without a grass collecting device, the cuttings or mowings are frequently ejected on to the mown surface in lump form, in dependence on the moisture contained in the cuttings or mowings, so that it is only with very great difficulty that the rotting procedure starts and the cuttings can go rotten and decay. In addition the cuttings which lie in lumps or layers on the mown lawn can impede and retard further growth, as they prevent light having access to the lawn.

EP 0 526 763 A2 proposed developing a known ride-on lawn mower in such a way that connected to the cutting device is a dehydration device for the mowings, in which a mechanical pressure is applied to the mowings to press liquid out of same. The cuttings are ground and compacted by a screw. In that operation its surface is broken open, that is to say increased, so that the rotting or decomposition process (composting) can start more quickly and can take place at an accelerated rate. The cuttings are then spread out in the area around the mower by means of a spreading disk which rotates in a horizontal plane. Beforehand the cuttings can be chopped up or separated from each other for example by means of a chopping unit. The proportion of liquid in the cuttings is pressed out in the compacting operation in the dehydration device and can issue downwardly towards the ground through bores in the proximity of the outlet of the dehydration device.

Composting fresh grass cuttings gives rise to problems in particular by virtue of the poor structure and the high water content of the cuttings. The cuttings which involve a weak structure stick together, and cowpat-shaped compacted zones are formed, in which gas exchange with the outside air is seriously restricted. That results in anaerobic conditions in the compost pits and results in smells which are a nuisance as well as severely delayed microbial conversion. It is therefore recommended that grass cuttings should be composted in combination with other organic materials which are of a stable structure (for example wood cuttings). However, on meadows on which very large amounts of mowings are produced, chopped wood material is frequently not available to the required extent.

Furthermore the emission of concentrated seepage juices which are formed in static pit composting causes problems.

The object of the present invention therefore is that of providing a mowing method which guarantees that the ground is not deprived of valuable nutrients contained in the grass, in the mowing operation, further plant or grass growth is not impeded, and over-fertilization can be obviated.

A second object of the present invention is to provide a composting method in which the decomposition process is optimized, the nutrients necessary for the mown meadow remain there as fertilizer and substances which are harmful to the environment cannot occur in concentrated form.

A third object of the present invention is to provide a mowing machine with which the mowing method and the composting method can be carried into effect, wherein the cuttings are to be of a surface structure which is advantageous in terms of a decomposition process. The invention further seeks to provide that the mowing machine enjoys improved environmental compatibility in terms of power requirement and the production of noise.

Finally a fourth object of the present invention is to provide a cuttings processing apparatus which can process mown cuttings in an improved manner.

The first object is attained in accordance with claim 1 by a method of mowing meadows, lawns and the like, in which the plants to be mown are cut, the cuttings are collected in the cutting operation and then compacted, the compacted cuttings are chopped for finely breaking up its surface, the cuttings are further compacted, wherein the liquid contained therein is pressed out and fed in a meterable mode to the ground and the cuttings are distributed on the ground.

This method affords the advantage that the ground is not deprived of the nutrients contained in the grass or the plants (by removal of the mown grass), but the nutrients are supplied thereto again by way of the pressed-out liquid. The feed is effected in a controlled or metered manner so that in the event of a threat of over-fertilization, nutrient-containing liquid can be held back or removed and can be used in some other fashion. The moisture-removal operation is adjusted in such a way that a residual moisture content remains in the cuttings, as is required for rapid decomposition or composting of the finely divided cuttings.

Preferably the liquid is collected and put into intermediate storage for the metering procedure after having been pressed out of the cuttings, before the liquid is fed to the ground. That ensures that the liquid can be uniformly taken from an intermediate storage means and applied to the ground. That avoids irregular ground fertilization.

When chopping up the cuttings the conditions for the subsequent decomposition process are optimized as the extreme increase in the surface area of the cuttings means that the micro-organisms involved in the decomposition effect can more easily penetrate into the individual pieces of vegetation or blades of grass, thereby providing a homogenization effect and a good breaking-down action. The carbon/nitrogen ratio which is very narrow in the case of young grass in the Spring and which influences the decomposition time is advantageously enlarged by slight pressing in the compacting operation. The excess nitrogen is removed with the expelled liquid. Thus a good C/N-ratio of about 14:1 occurs even with disadvantageous initial conditions.

The decomposition of organic substance normally takes place in two phases. Firstly substances which can be easily decomposed by bacteria, such as sugar, are broken down. Then fungi decompose substances which are difficult to decompose such as cellulose or lignin. By virtue of the partial separation of those substances, both procedures can take place virtually in parallel, whereby decomposition is substantially accelerated and matting of the turf is prevented. The fact that the cuttings are finely chopped also affords the possibility of very fine distribution over the mown surface, and the procedure does not result in clump formation and thus anaerobic conditions. No smells are involved. Finally the method according to the invention results in a closed nutrient circuit in which organic substances are continuously subsequently supplied to the ground. The amounts of nutrients required by the plants are not exceeded. Artificial or mineral fertilizers are usually no longer required.

This first-mentioned object of the invention is also attained by a method having the features of claim 3. In that method the cuttings in which the moisture or liquid is left are fed to the ground again at high speed. The cuttings penetrate into the ground and thus ensure the necessary nutrient supply. Clump formation with the adverse consequences in terms of the decomposition process and grass growth does not occur. As no or only few loose grass cuttings residues remain on the mown surface, this method can be used for example on golf courses which are playable again immediately after mowing.

Advantageously the cuttings are fed to the ground in the cutting region of a cutting member of a suitable mower, in order not to adversely affect the plants which are still to be cut. That is desirably effected in the cutting process immediately after the cutting operation. Acceleration of the cuttings can be effected by means of centrifugal force produced by a rotary movement. That kind of acceleration makes it possible in a simple manner to achieve a high speed of movement of the cuttings, for penetrating into the ground. The method is of a particularly advantageous nature if the rotary movement of a cutting member is used to produce the acceleration. The cuttings can then be supplied directly in the cutting region.

If moisture is at least partially removed from the cuttings in the compacting operation and the liquid which is collected in that situation is fed to the ground in a metered mode, the necessary nutrient requirement can be adjusted according to the respective needs involved. Collection and intermediate storage of the liquid provides for a uniform delivery of liquid even when the meadow to be mown has regions with little or no plant growth, in which no nutrient liquid is produced.

If, in the case of the methods according to the invention, the collected cuttings are pre-compacted on their path of transportation movement to the compacting step, the volume flow to be processed decreases and the mass of cuttings can be processed in smaller processing devices.

The second-mentioned object of the invention is achieved by a composting method. In comparison with central composting in compost pits, being a procedure in which the grass has to be collected up and transported to a compost pit, the cuttings are admittedly also collected, but they are treated immediately in such a way that their volume is reduced and their nature is adapted for optimum composting or decomposition decentrally on the mown surface. The cuttings from which moisture has been substantially removed can rapidly decompose in finely divided form and the nutrient-rich liquid is fed to the ground again in a metered procedure so that additional fertilization is generally not required.

The second-mentioned object of the invention is further attained by a composting method. In contrast to the preceding method moisture is not removed from the cuttings but the cuttings with their liquid nutrients are applied on to and introduced into the ground so that a predominant proportion of cuttings goes into the ground, where there are optimum conditions for the decomposition process. Block-like clumping of the moist cuttings is prevented so that there is no impediment to the growth of the cut-down plants (the grass).

Desirably, as set forth in claim 12, plant liquid which is produced upon compacting of the cuttings is collected and returned to the ground, together with the cuttings. In dependence on the moisture content of the plants to be mown, the moisture content of the cuttings can be adjusted to a value which is the optimum one for decomposition.

The third-mentioned object of the invention is attained by a mowing machine. Advantageous configurations of the invention are recited in the appendant claims. The cuttings which are returned to the rotating cutting member can be finely distributed by same on the ground. That means that there is no need for an additional distribution device which would possibly have to be driven and which would require structural space. Any blade arrangements and rotational axes which are oriented in any desired manner can be used for the rotating cutting member. Preferably, in a structurally simple design, the mowing machine has a cutting member with a vertical axis of rotation so that the blade or blades cut off the plants in a horizontal cutting plane which is adjustable in respect of height. If the cutting member has a distribution device for the cuttings, the cuttings can be fed to the ground in a specifically directed fashion, for example in an accelerated mode. A distribution device of that kind can be an integral part of the cutting member. Desirably the cuttings are fed to the cutting member in a cuttings receiving means in the proximity of its axis of rotation in a region of lower peripheral speed. Distribution of the cuttings can be effected at any location of the cutting member, but in the case of a distribution member which is radially remote from the axis of rotation, the cuttings can be accelerated by centrifugal force and discharged in finely distributed manner. The cuttings are transported unimpededly by an air flow in the cutting space from the cuttings receiving means to the distributor member through a conveyor or hollow passage in the cutting member. The cuttings receiving means may have at least one guide surface in order to guide the cuttings directly and/or by way of the generation of an air flow into the conveyor passage. The cutting member and/or the hollow space may extend radially substantially linearly outwardly. It is equally possible to use a cutting member with vanes which are for example curved in a sickle shape in the horizontal plane, with cutting blades mounted thereon. In the conveyor passage which is adapted thereto, the cuttings are discharged outwardly to the distribution member on a transport-promoting, sickle-shaped path of movement. The transportation action is assisted by a friction-reducing coating on the inside surface of the conveyor passage. That prevents the cuttings from adhering and promotes a self-cleaning effect. The guide surface in the cuttings receiving means may be a frustoconical surface which is symmetrical with respect to the axis of rotation and which radially outwardly deflects the cuttings which are fed thereto in parallel relationship with the axis of rotation. Preferably the conveyor passage has a downstream-guiding guide surface in the region of a discharge opening so that the accelerated cuttings is returned on to and into the ground at high speed in substantially parallel relationship with the axis of rotation of the cutting member. The distribution device can also be mounted as a separate component on the cutting member or can be rotationally coupled thereto. For example it is in the form of a hollow chamber-like distribution centrifuge with hollow vane-like discharge passages, which is arranged coaxially with respect to the cutting blade for joint rotation therewith, for example on a motor shaft of a drive motor. The return conveyor device can be in the form of a screw conveyor or in the form of a conveyor belt which is arranged in a conveyor passage and which receives the cuttings after the chopping device and takes them back to the cutting member.

The third-mentioned object of the invention is further attained by a mowing machine. Advantageous configurations are recited in the appendant claims. The liquid collecting and discharging device according to the invention can provide that the nutrient-rich liquid which is expelled from the cuttings can be collected and fed to the ground in a metered fashion. The nutrients therefore remain at the location at which they are produced, as natural fertilizer. The dehydration device is an additional compacting unit with a compacting screw, preferably of a conical shape and/or with an increasing pitch and coaxially with respect to the first compacting unit in order to effect compacting of the cuttings, which is required for expelling liquid, in a structurally simple and space-saving manner. The expelled liquid can escape through openings (bores or slots covered with sieves, or the like) in a housing of the compacting units. The liquid is caught in a collecting device disposed therebeneath, for example a drain channel. The drain channel may have a retaining device in the form of a heightened web or the like so that a given amount of liquid can be collected before it can pass over the web to the drain prongs. That provides that fertilization occurs only when an adequate amount of liquid for a fertilization effect is available over the entire width of the drain channel which can correspond to the cutting width. If the expelled amount of liquid is still too low at the beginning of the mowing operation therefore after collecting sufficient liquid the machine must pass over the first line of cut once again (in the idle cutting mode). If an additional liquid storage means is provided, fertilizer liquid which is stored therein can be taken therefrom at the beginning of the mowing procedure for immediately starting fertilization. The retaining device or the height of the retaining web can be adjustable in order to be able to adjust the time up to the commencement of applying fertilization in dependence on the degree of moisture contained in the cuttings (Spring grass with a high juice content or drier Fall grass) or the discharge of liquid out of the retaining device into the additional liquid storage means. Preferably the drain prongs are of such a length that they are in contact with the ground in the mowing operation. In that case they pass through or divide the vegetable growth and carry the nutrient fluid down to the ground so that it does not just provide for surface wetting of the plant growth and possibly evaporate there.

In the mowing machines according to the invention the chopping device may be a unit of chaff cutter type, but preferably a more compact and more robust cutting blade unit is employed. The apertured disks can be interchangeable so that disks with different aperture diameters and numbers of apertures can be used in order to be able to adjust the required counter-pressure for the compacting operation and the fineness of the chopping operation, in dependence on the moisture content and the strength of the cuttings.

The mowing machine according to the invention may have a cuttings conveyor device for conveying the cuttings out of the cutting region to the compacting device, in the form of a conveyor passage in which a mechanical conveyor device is arranged. It requires considerably less power for transporting the cuttings in comparison with the conventional 'fan' transportation mode using the boosted air flow of the cutting blade. Preferably the conveyor device has a conveyor belt arranged at the top side of the conveyor passage and a conveyor belt arranged at the bottom side. The two moving sides afford a particularly effective conveyor action. Pre-compacting of the cuttings which are supplied in a loose condition can be achieved by the conveyor belts being arranged inclinedly relative to each other in the direction of conveying movement. A particularly effective conveyor action is achieved if each conveyor belt has raised conveyor elements, for example conveyor lips, which promote the conveying effect mechanically and also by producing a suction action.

The described mowing machines can be in the form of hand lawn mowers with wheels and a self-supporting housing, for example of cast aluminum. A plurality of mowing machines can be installed in a support frame in order to achieve a greater mowing width in one mowing operation. It is possible to provide respective specific drives (electric motor or internal combustion engine) or a support frame can be pulled along behind a tractor, in which case the mowing machines are driven by same.

Desirably there is provided an additional storage device for storage of the expelled liquid. The threat of over-fertilization can then be obviated by removal of the nutrient-rich liquid. Likewise detoxification or decontamination can be effected in the case of polluted meadows if the liquid which is pressed out of the cuttings and which contains the pollutants is stored during the mowing operation and then discharged in a controlled fashion. On the other hand it is possible to provide that storage device or an additional container for receiving and metered discharge of additive substances for fertilization purposes in the event of deficient nutrient supply.

Preferably the mowing machine includes a flushing liquid connection in order to be able to supply flushing or cleaning liquid (for example also water). The cleaning liquid may be passed by way of a distribution system to all regions of the mowing machine which are liable to suffer from contamination or fouling. In the idling condition the mowing machine can then be cleaned without any difficulty, with the feed of the cleaning liquid. The housing of the compacting units can be divided for the cleaning operation and for the removal of foreign bodies so that the compacting screws are easily accessible.

Desirably the mowing machine includes a transmission for regulating the travel drive and/or the cutting force, when the mowing conditions vary. The transmission can be steplessly adjustable for optimum adaptation purposes.

The fourth-mentioned object of the invention is attained by a cuttings processing apparatus. The compacting unit with blade set and subsequent dehydration device can be used without a mowing device as a cuttings or grass processing apparatus for grass which is mown and collected with conventional mowers. A grass processing apparatus of that kind is designed for a greater through-put in comparison with the compacting unit of the lawn mower, in order to be able to process large amounts of grass as are produced for example when mowing golf courses, in a short period of time. The grass or cuttings is or are put on to a conveyor belt which transports the grass through a water bath in which foreign bodies (for example stones) sink downwardly and are collected there. Removal of foreign bodies can also be effected by means of a shaker surface which is known from agriculture. After the water bath, the grass is fed by way of a hopper or a conveyor device to the compacting unit, compacted therein, chopped up with the blade set and then moisture is removed therefrom in the dehydration device. The nutrient-rich liquid and the solid material remaining from the cuttings are collected separately. The liquid can be discharged at another location as fertilizer and the solid material can be distributed in a similar manner to bark mulch under bushes or hedges. In that way it is possible for example to obviate undesirable over-fertilization of the playing surface of golf courses. Desirably the grass processing apparatus is arranged on a mobile support so that it can be transported to the location at which it is required, and it may have its own drive. The cuttings processing apparatus may also be designed in the form of a domestic apparatus for private garden use. It is then mounted on a stand and has its own drive.

The fourth-mentioned object of the invention is also attained by a cuttings processing apparatus. That cuttings processing apparatus is designed for mobile use.

Figure 2:
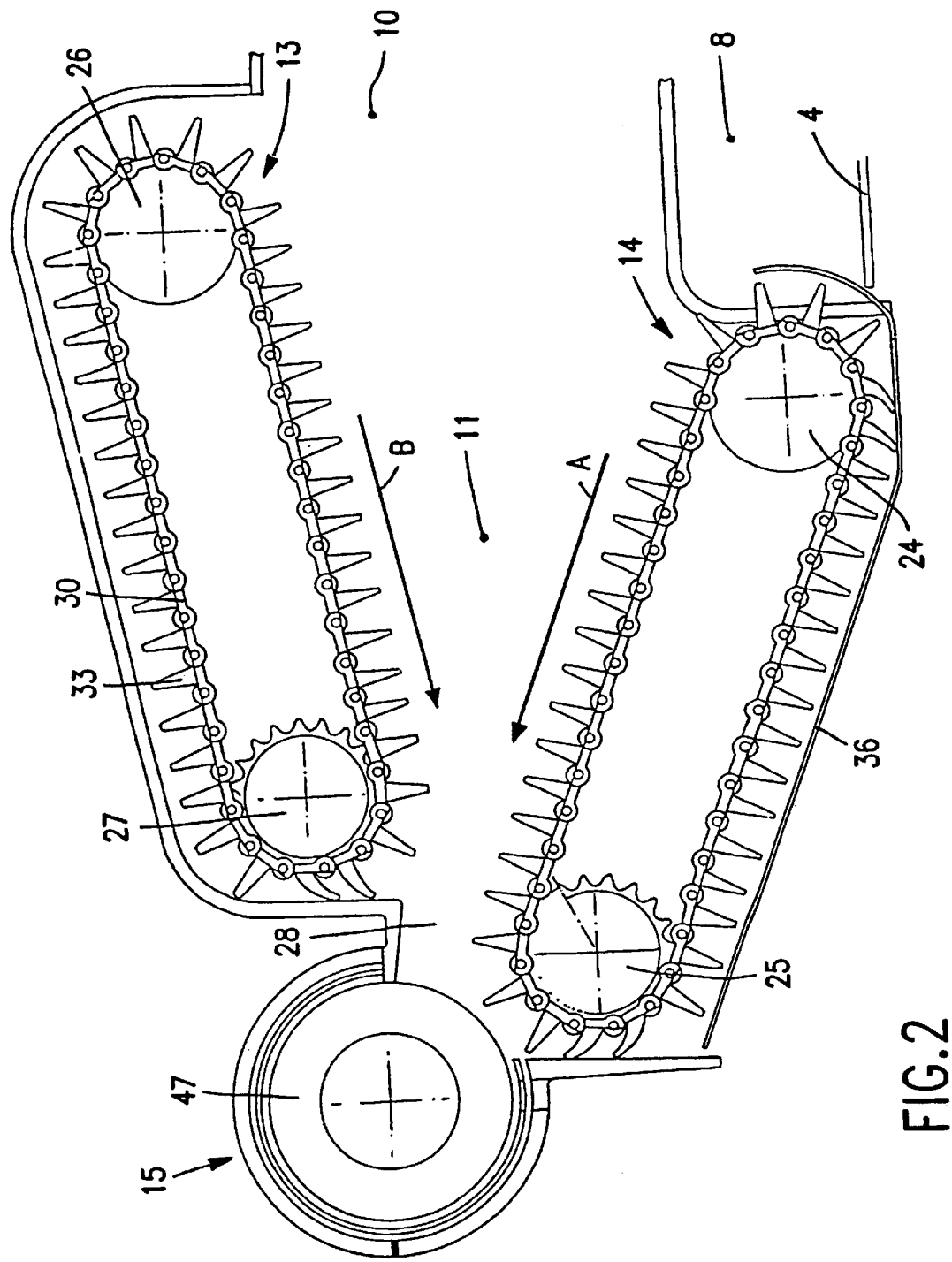
Figure 3:
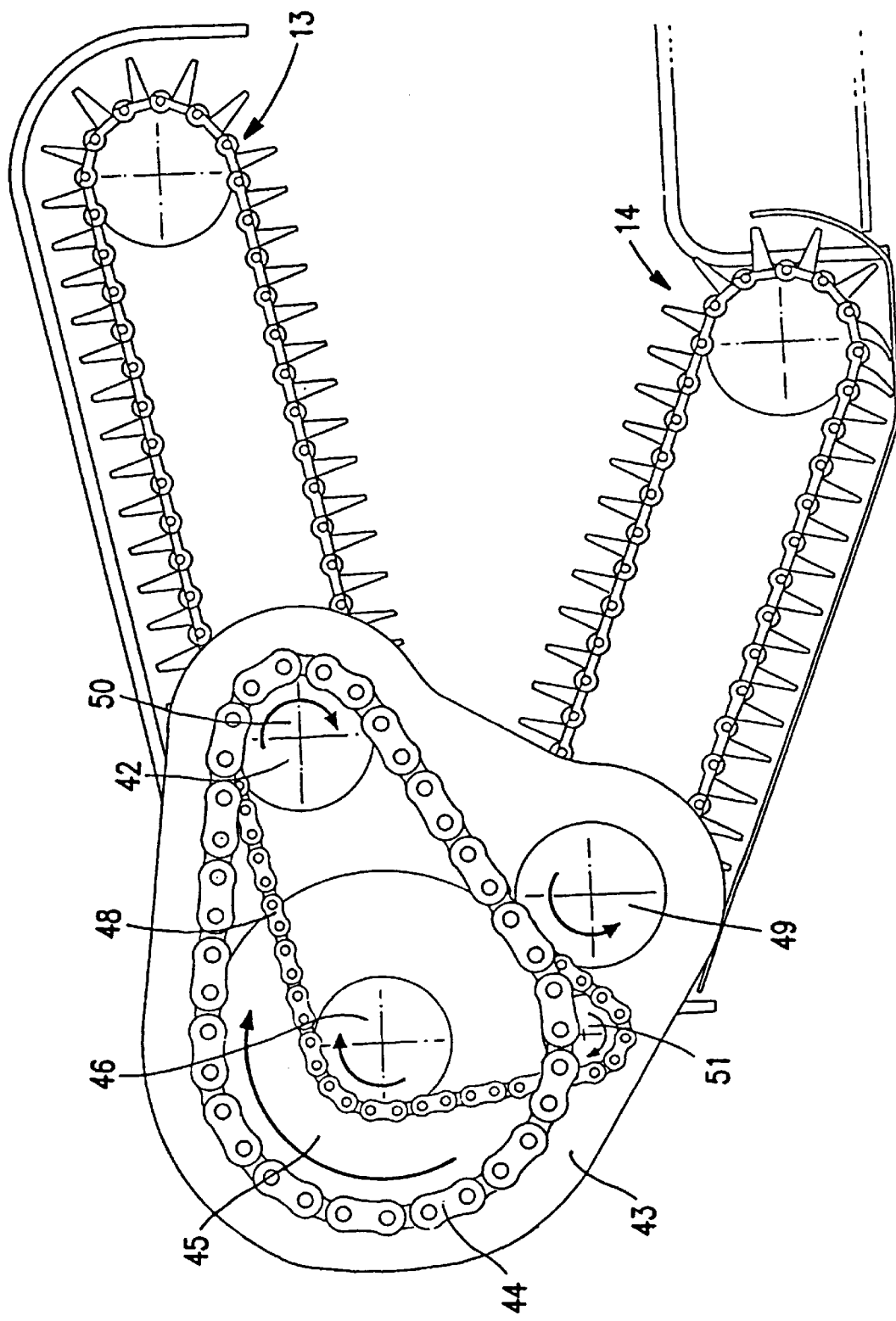
Figure 4:
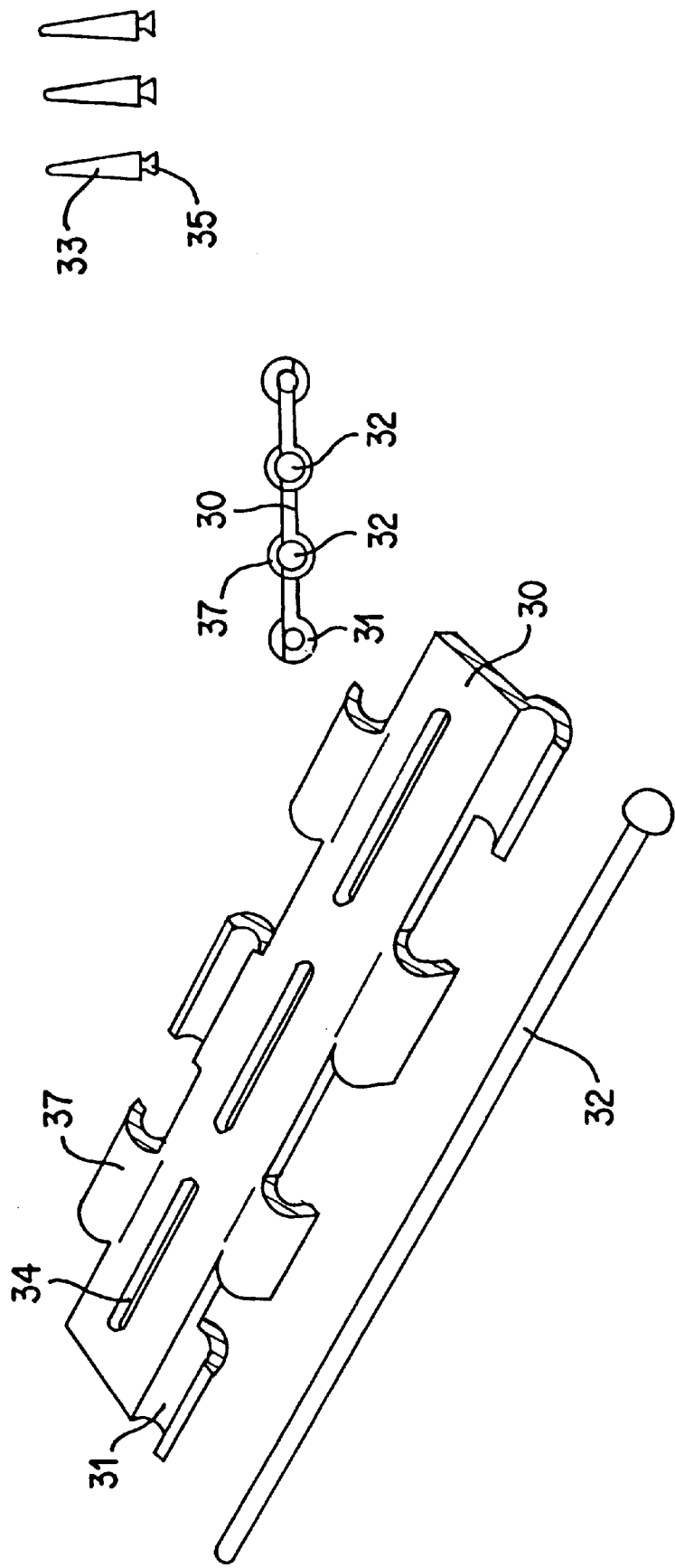
Figure 5:
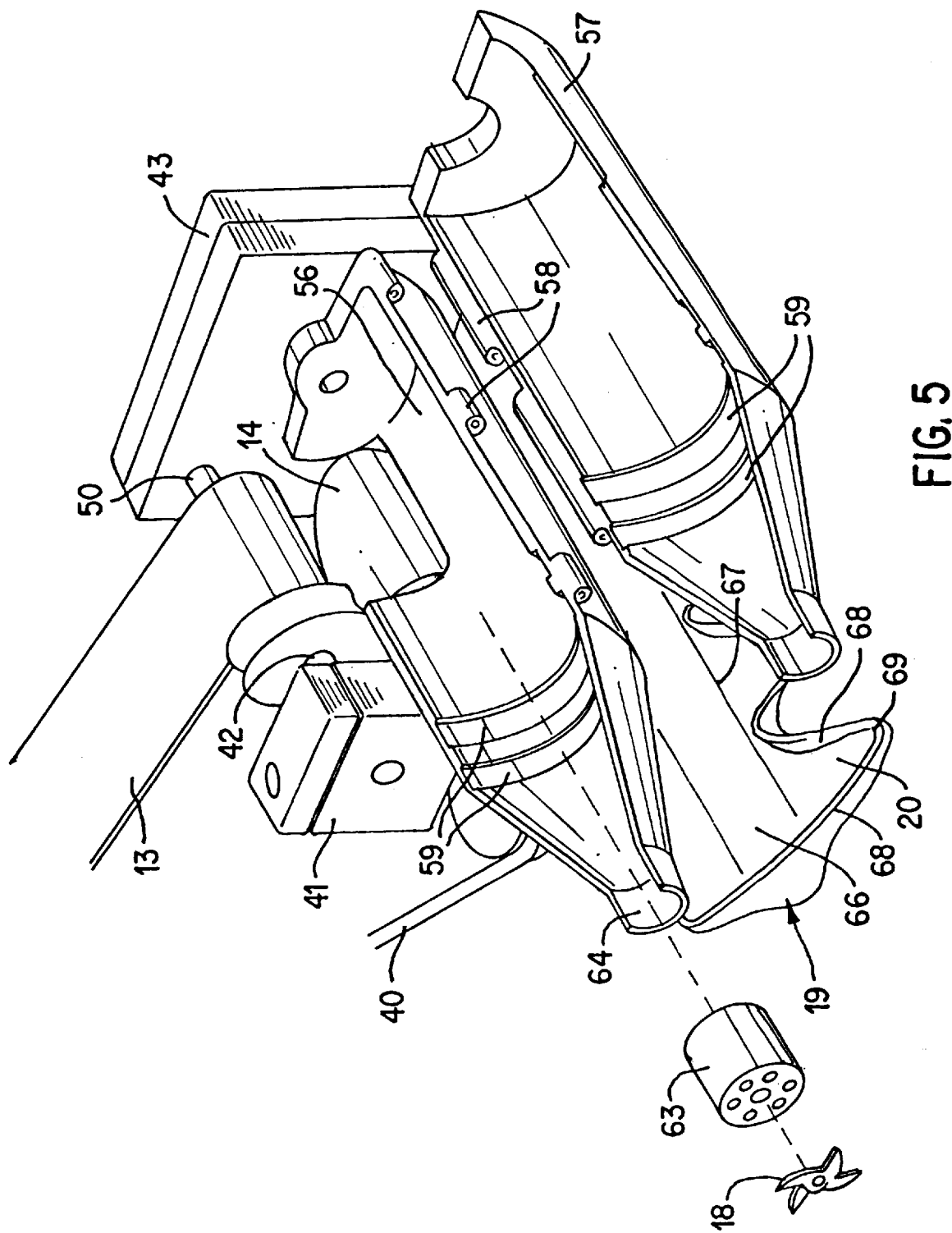
Figure 6:
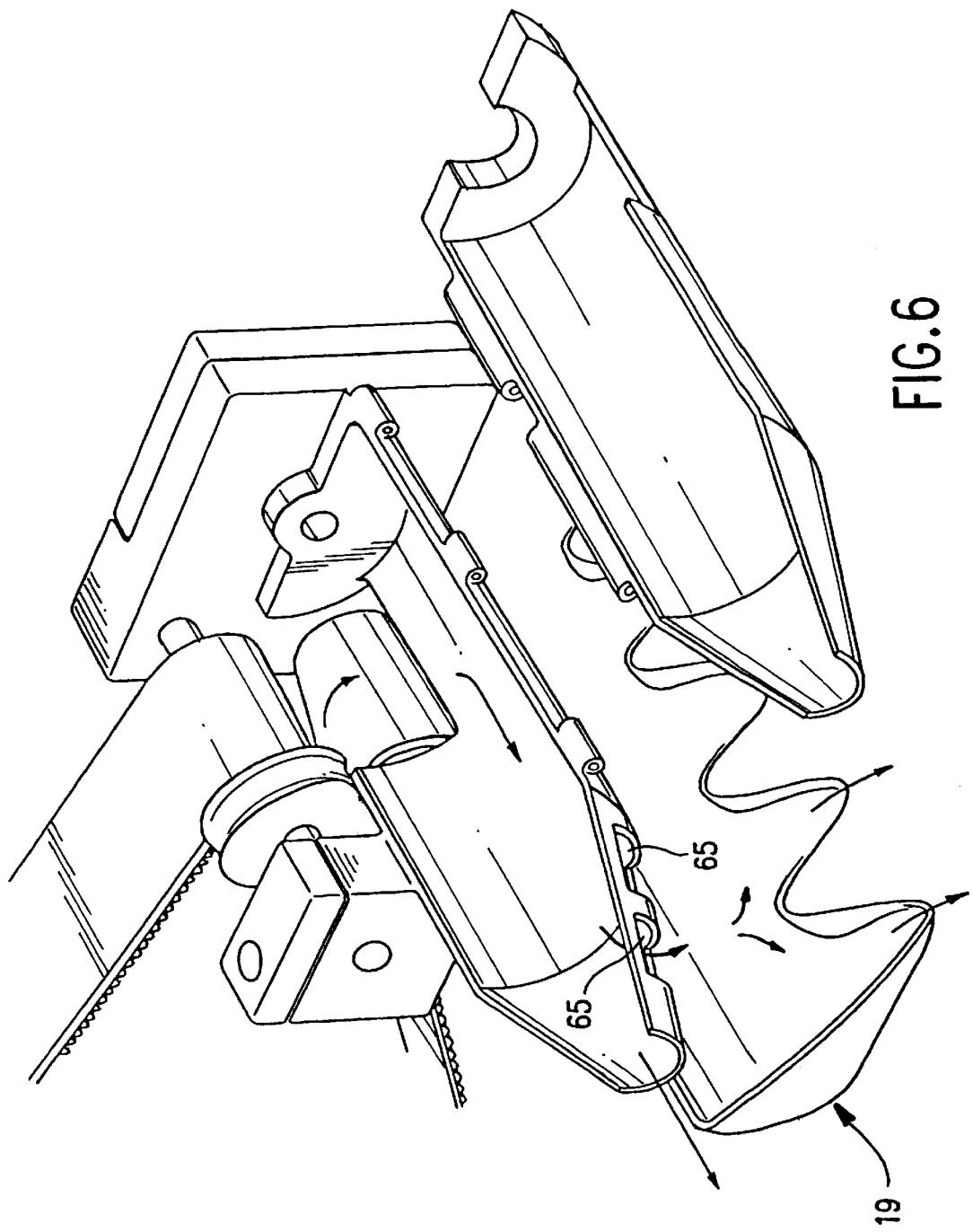
Figure 7:
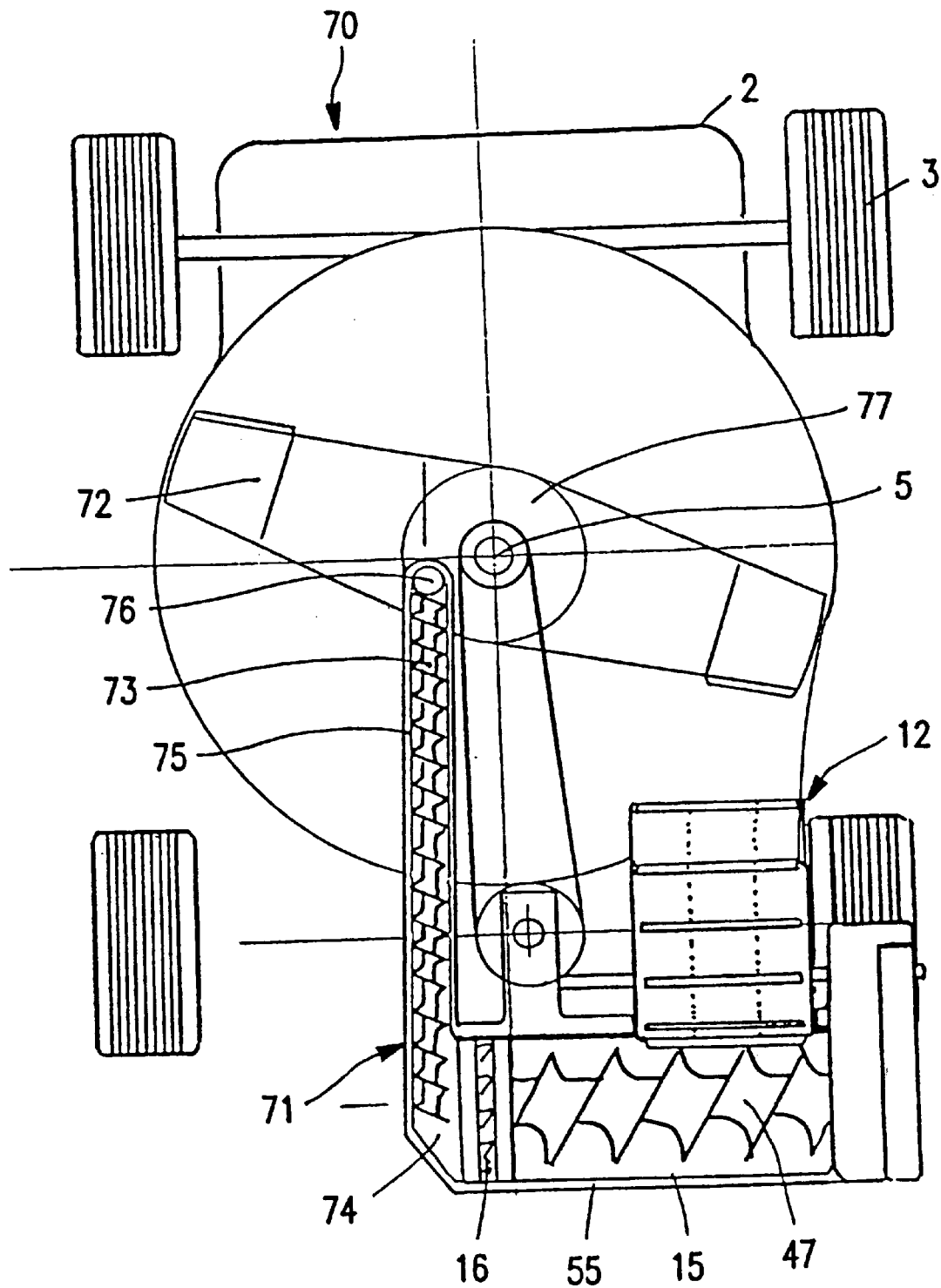
Figure 10:
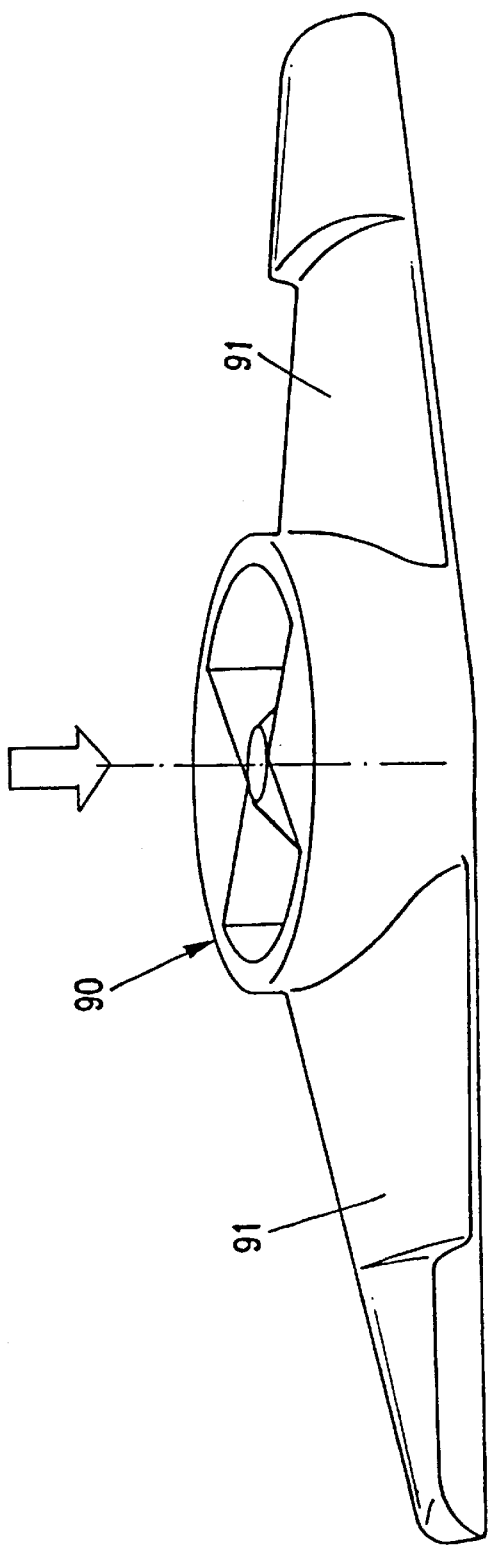
Figure 11:
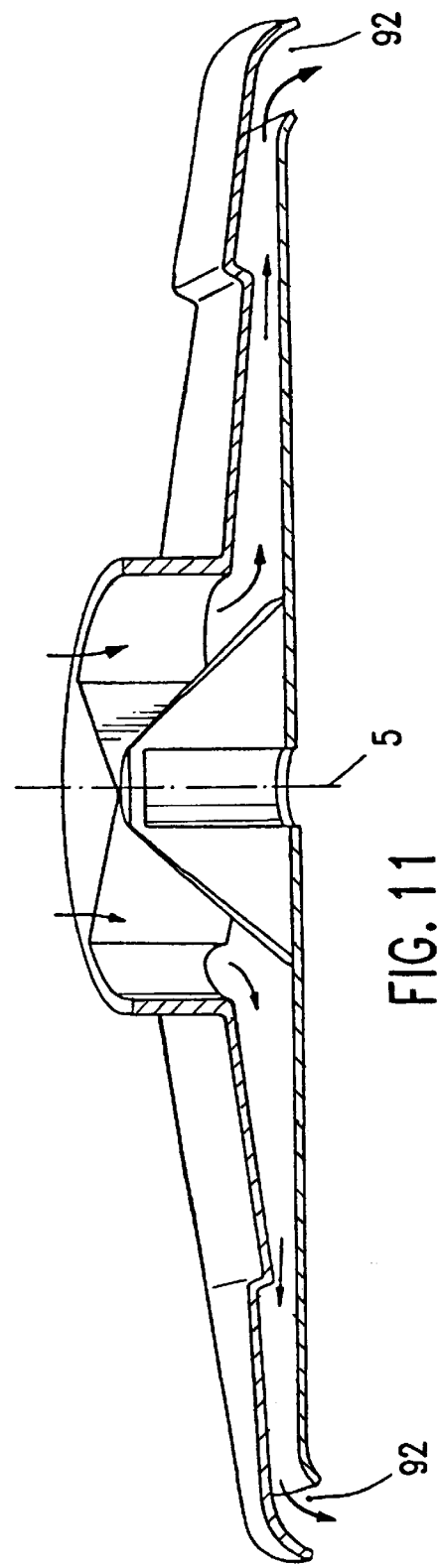
Figure 12:
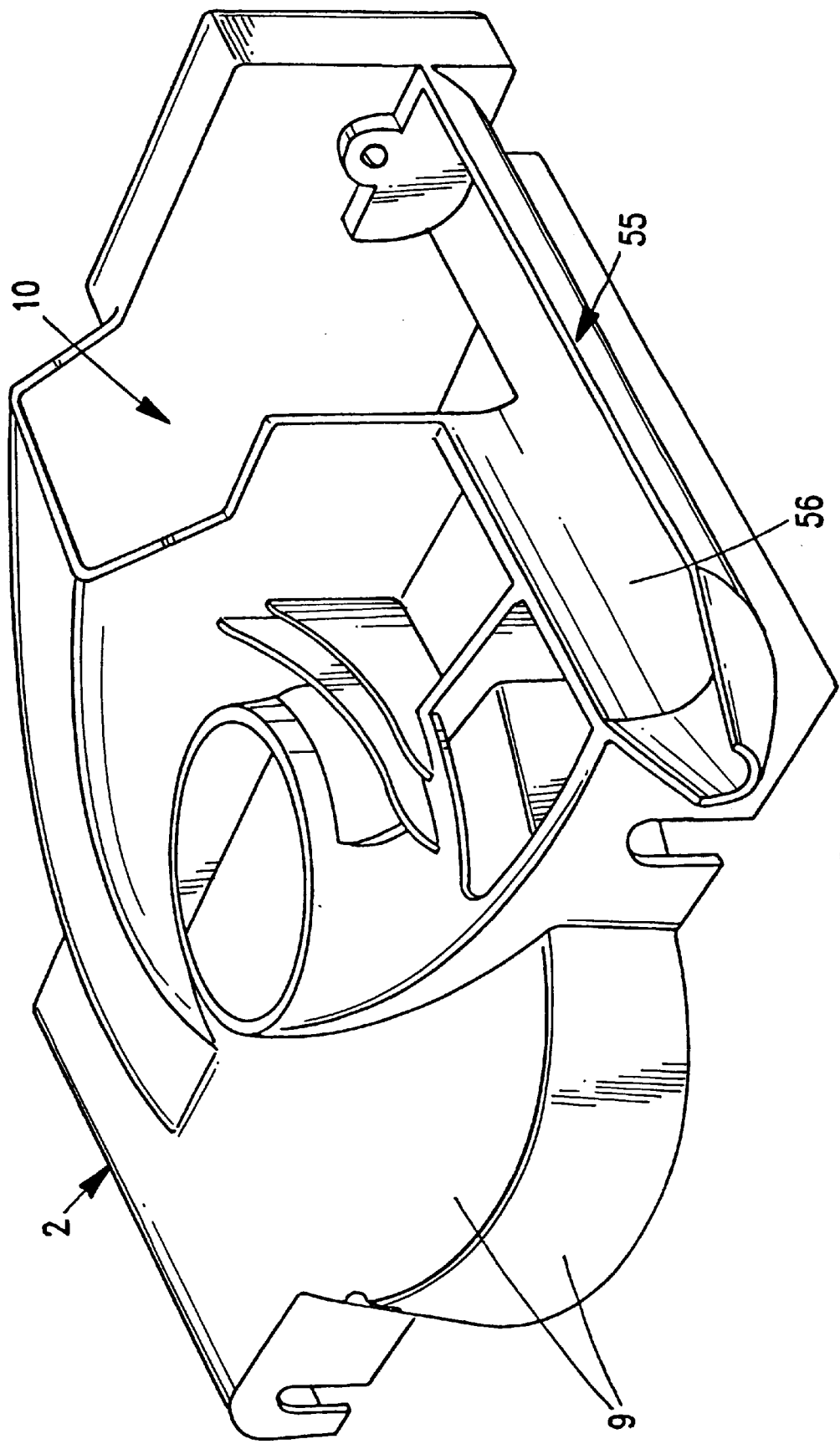
Figure 13:
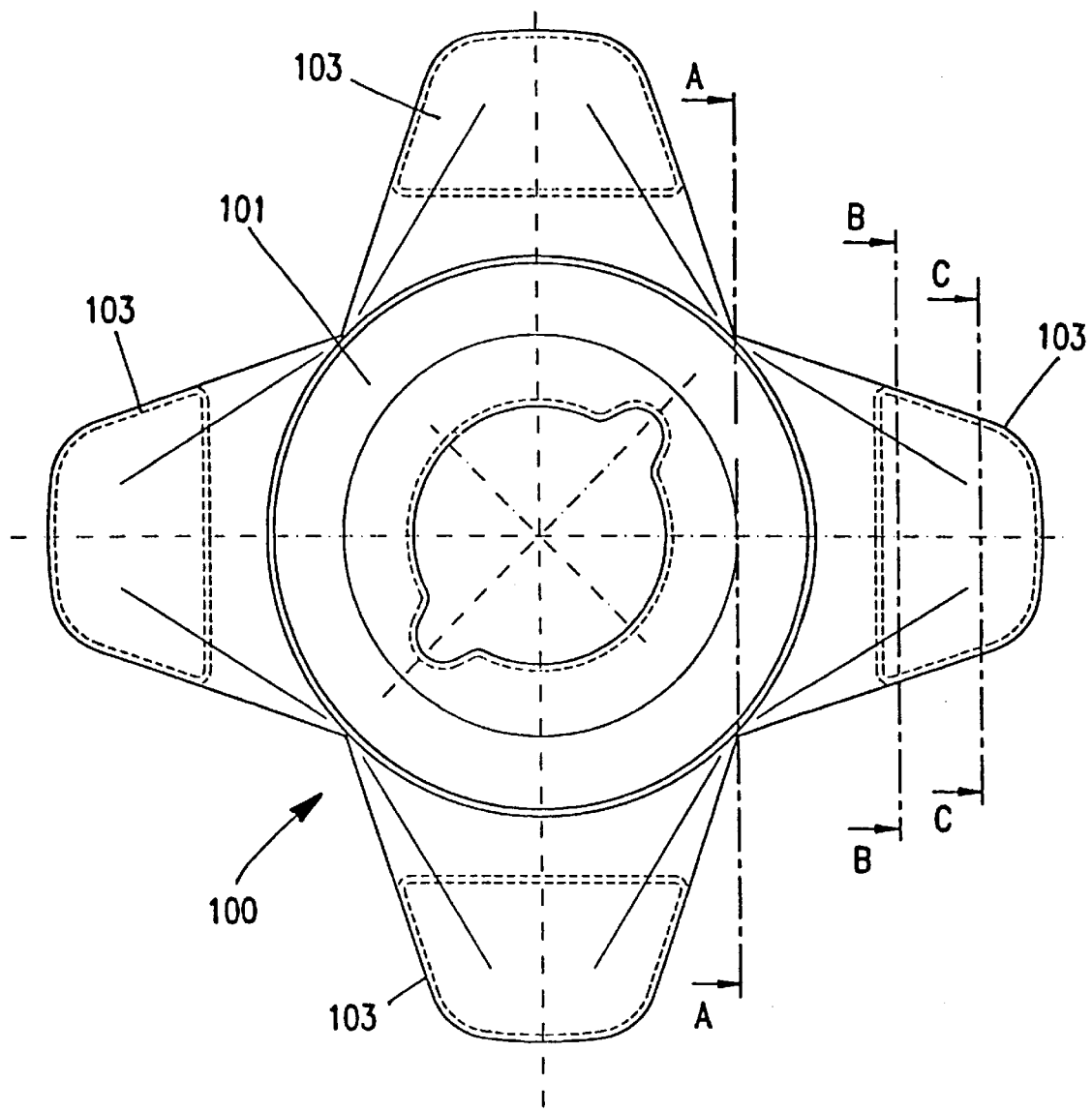
Figure 14:
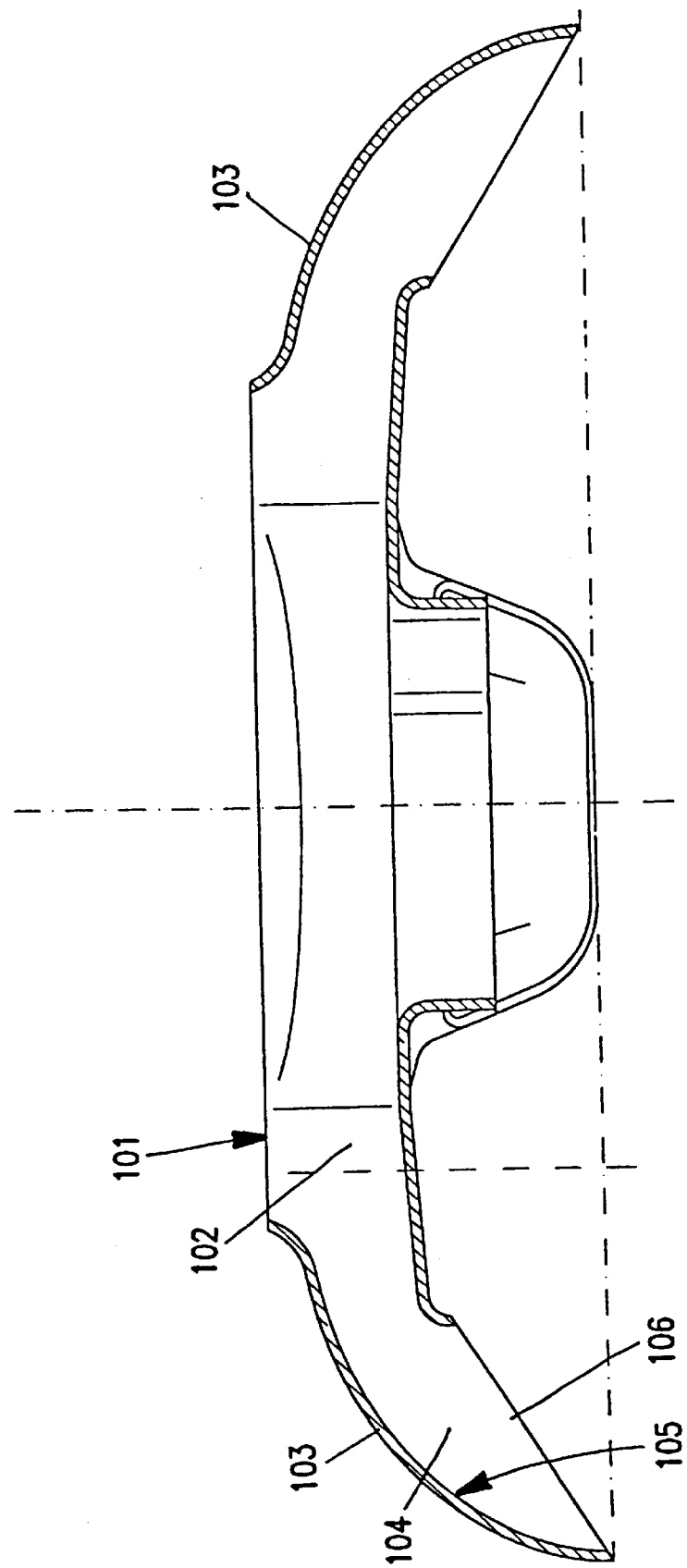
Figure 15A:
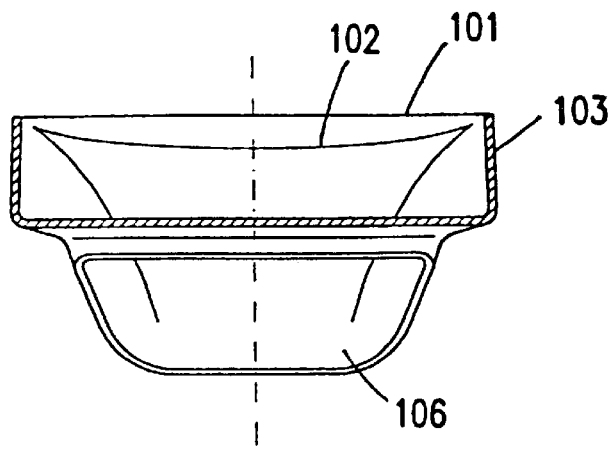
Figure 15B:
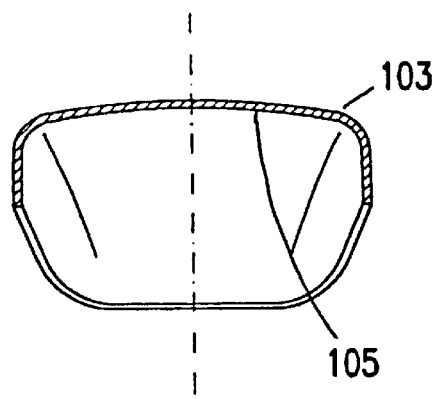
Figure 15C:
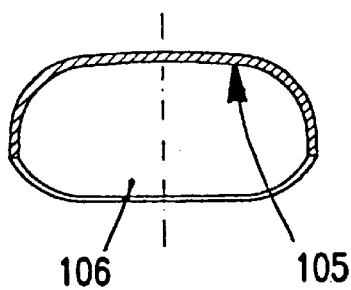
Figure 16:
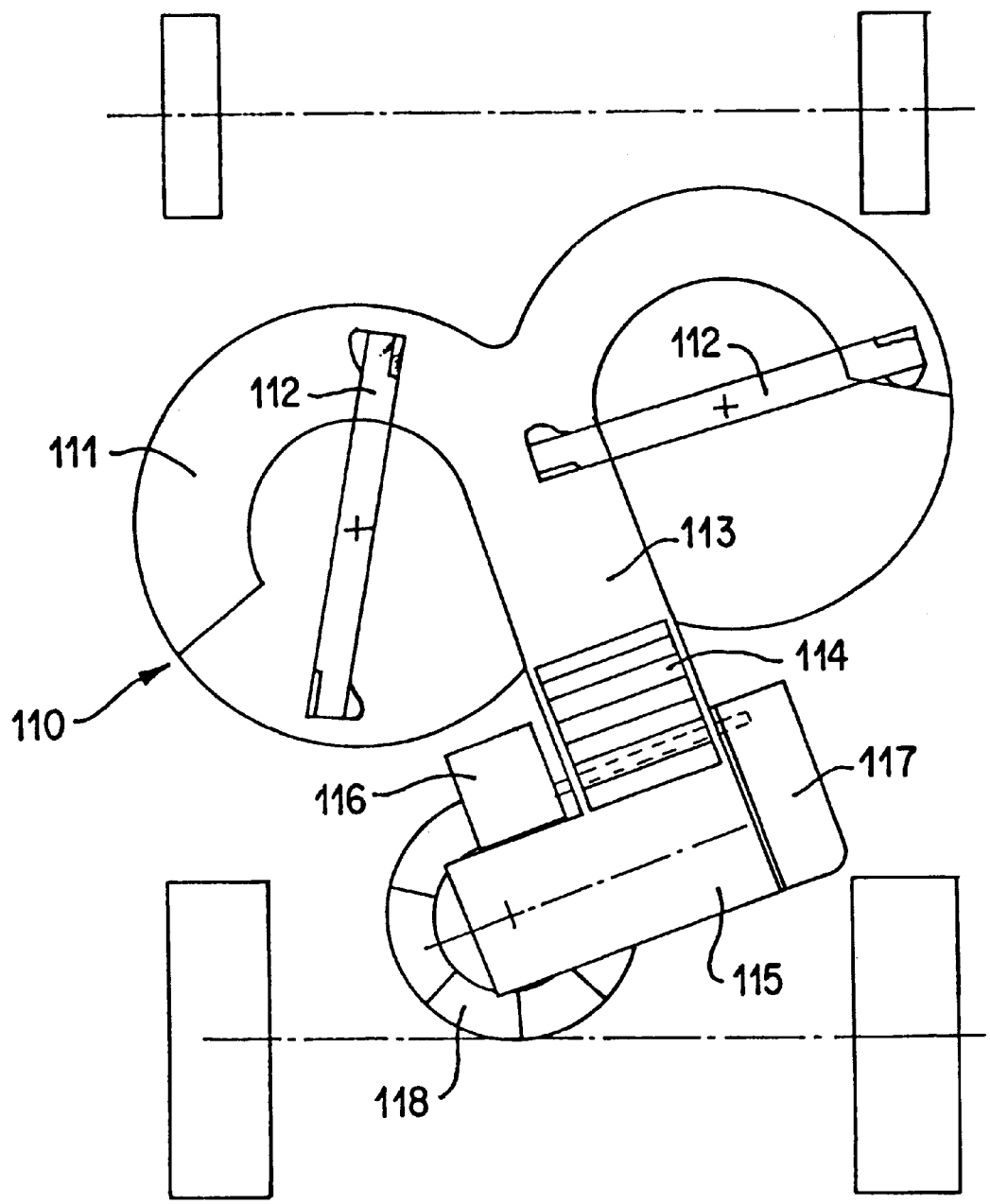
Figure 17:
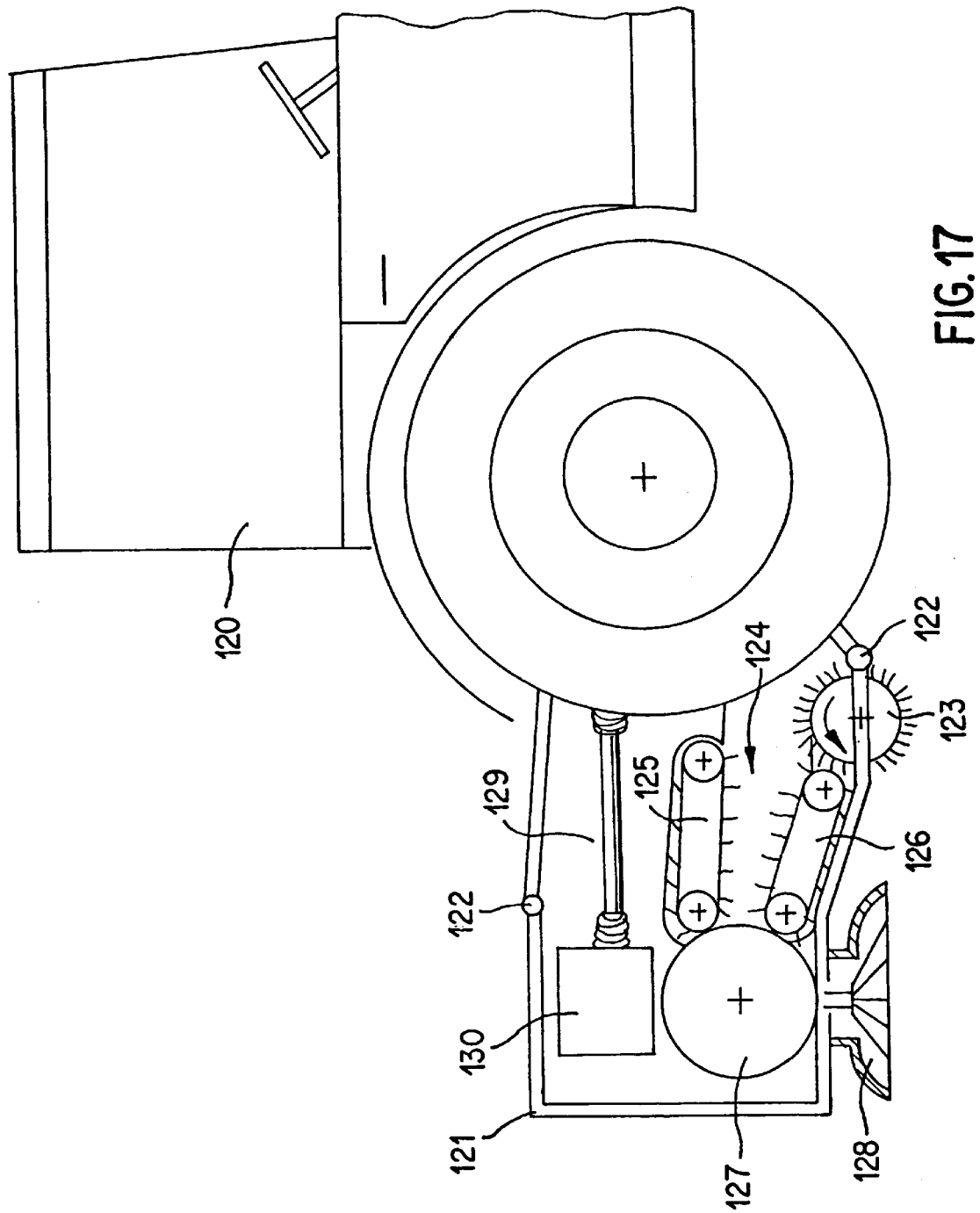
Figure 18:
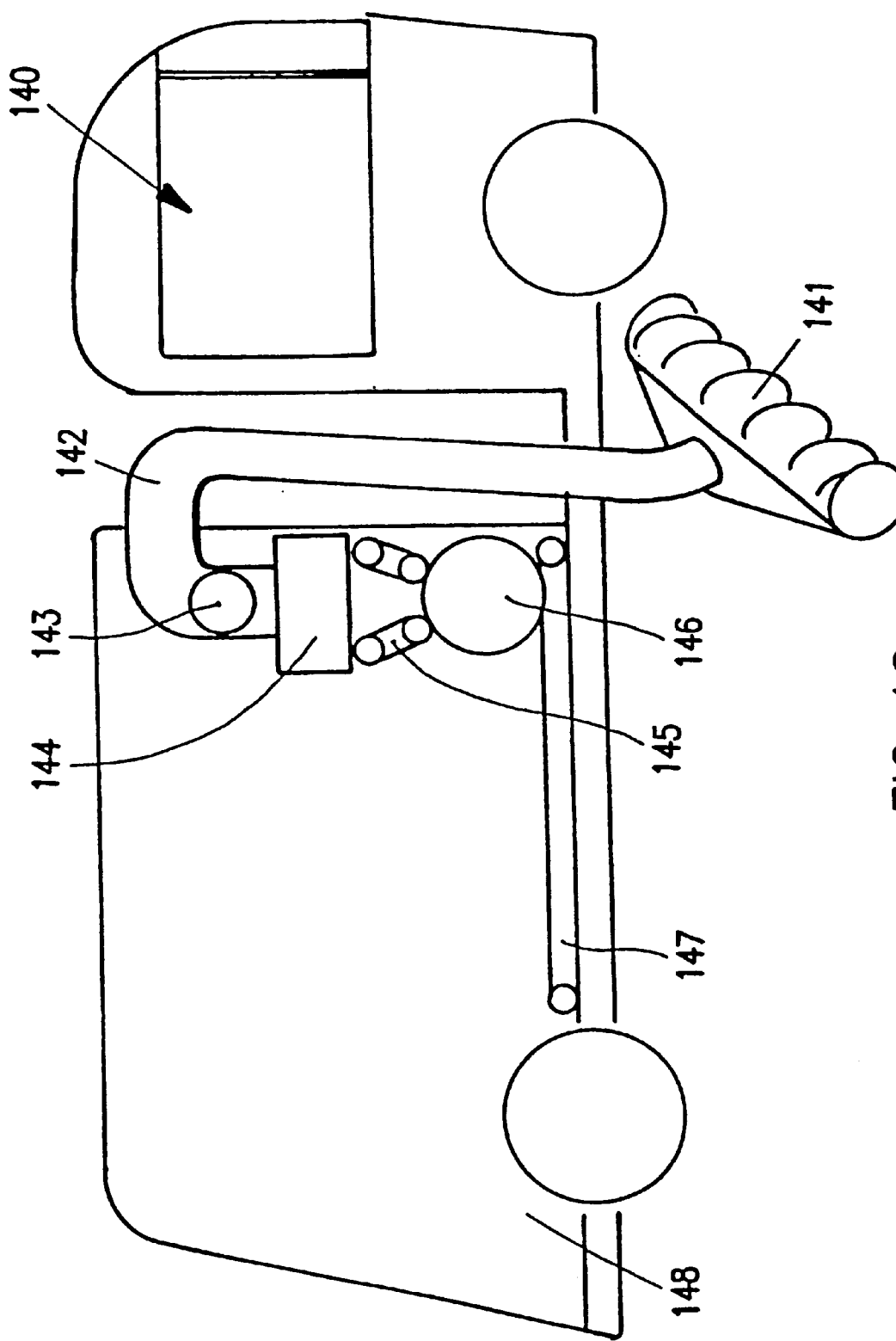
Figure 19:
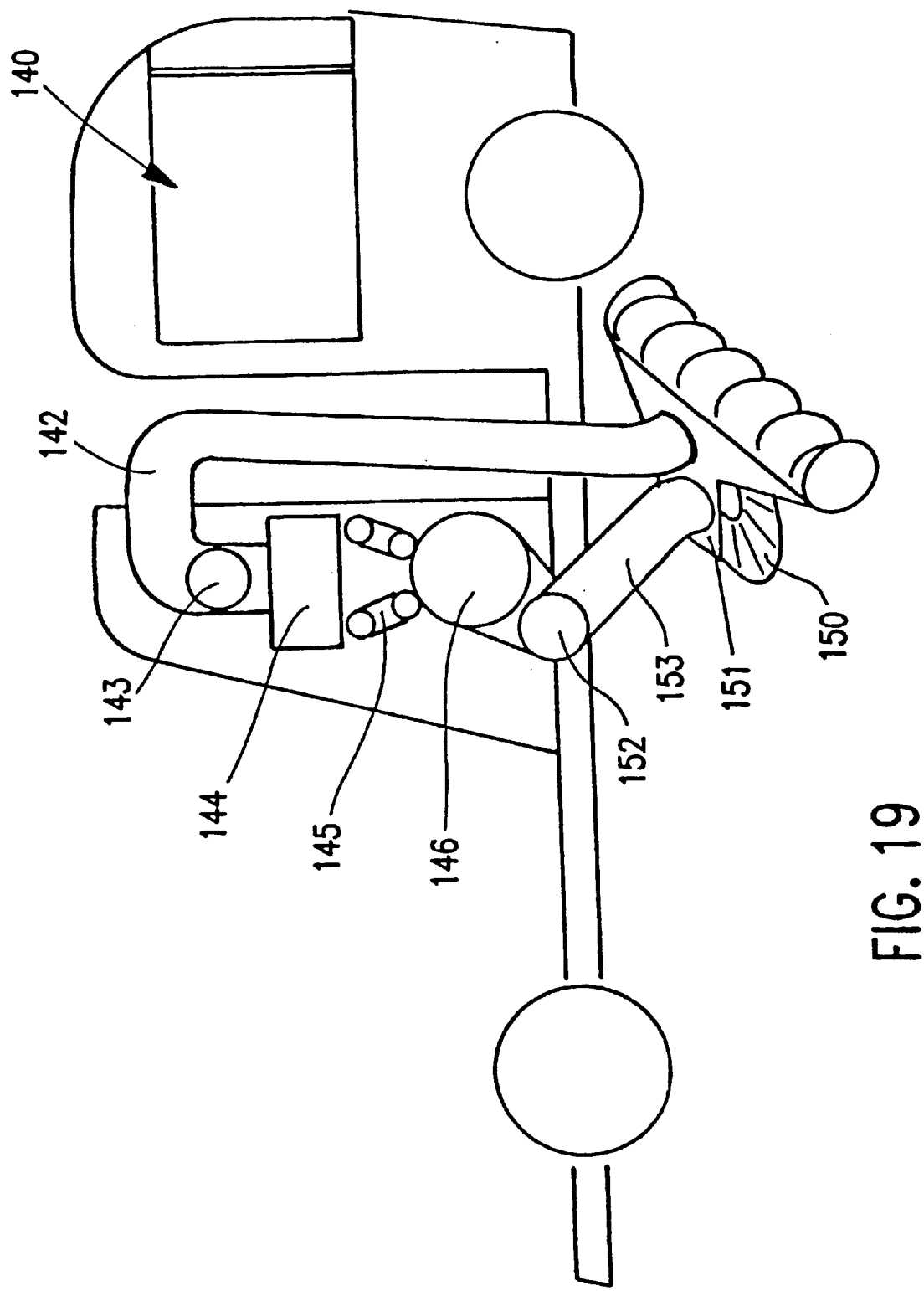

The invention is described in greater detail hereinafter by means of embodiments with reference to the drawings in which:

FIG. 1 is a diagrammatic plan view of a first embodiment of a mowing machine in the form of a hand lawn mower, FIG. 2 is a diagrammatic view in cross-section on an enlarged scale of a cuttings conveyor device in section taken along line A—A in FIG. 1, FIG. 3 is a view corresponding to FIG. 2 showing the drive of the cuttings conveyor device, FIG. 4 is a plan view of a chain member with associated components of a conveyor chain of the cuttings conveyor device, FIG. 5 is a perspective plan view, partly in exploded form, of opened housing portions of a compacting unit and a dehydration device, FIG. 6 is a view corresponding to FIG. 5 showing the cuttings path and the solid material and the expelled liquid, FIG. 7 is a diagrammatic plan view of a second embodiment of the mowing machine according to the invention, FIG. 8 is a plan view of a three-bladed cutting member, FIG. 9 is a view in cross-section taken along line B—B in FIG. 8 of a cutting member with cuttings feed, FIG. 10 is a plan view of an alternative two-bladed cutting member, FIG. 11 is a cross-sectional view of the cutting member shown in FIG. 10, FIG. 12 is a perspective view of a housing of a hand lawn mower in accordance with the first embodiment, FIG. 13 is a plan view of an embodiment of a distribution device for cuttings, FIG. 14 is a view in cross-section of the distribution device shown in FIG. 13, FIG. 15a is a cross-sectional view of the distribution device taken along line A—A in FIG. 13, FIG. 15b is a cross-sectional view of the distribution device taken along line B—B in FIG. 13, FIG. 15c is a cross-sectional view of the distribution device taken along line C—C in FIG. 13, FIG. 16 is a diagrammatic plan view of a further embodiment of a mowing apparatus, FIG. 17 is a diagrammatic side view of an embodiment of a cuttings processing apparatus, FIG. 18 is a diagrammatic side view of an embodiment of a mowing apparatus, and FIG. 19 is a diagrammatic side view of a modification of the embodiment shown in FIG. 18.

Referring to FIG. 1 a first embodiment of a mowing machine in the form of a hand lawn mower is shown diagrammatically with its essential components. The lawn mower 1 has a self-supporting housing 2 (see also FIG. 12) and four wheels 3. A cutting blade 4 is mounted rotatably in the housing 2 on a central mounting shaft with a vertical axis of rotation 5. The cutting blade 4 is shown by way of example with two blade arms 6, 7, but it may also have three or more blade arms (see FIG. 8: cutting blade with three arms). The cutting blade 4 is coupled to an electric motor or an internal combustion engine (not shown) and is drivable thereby. The drive motor can be arranged coaxially with respect to the axis of rotation 5 on the housing 2 and can be directly connected to the mounting shaft of the cutting blade 4.

The housing 2 forms a cover 9 of a cutting space 8 (see also FIG. 2 and FIG. 12) in which the cutting blade 4 rotates.

Provided in the cover 9 is an ejection opening 10 to which a conveyor passage 11 for the cuttings is connected. Arranged in the conveyor passage 11 is a cuttings conveyor device 12 which has an upper and a lower conveyor belt 13 and 14 respectively. The conveyor belts 13 and 14 are mounted inclinedly relative to each other in the direction of conveying movement so that the cross-section of the conveyor passage 11 which has substantially parallel side walls decreases in the direction of conveying movement.

Arranged adjoining the conveyor passage 11 is a compacting unit 15 which transports the cuttings, with further compacting, to a chopping device, for example a blade set 16, in which the cuttings are chopped up. A downstream-disposed dehydration device 17 serves for additionally compacting the cuttings, in which case the liquid therein is very substantially expelled therefrom. The cuttings from which moisture has been removed, on issuing from the dehydration device 17, is cut up by a rotating blade 18 and distributed in chopped form on the ground. The expelled liquid is collected in a drain channel 19 beneath the dehydration device 17. The collected liquid can be returned to the ground again by way of drain prongs 20 of the drain channel 19.

The lower conveyor belt 14 of the cuttings conveyor device 12 (see FIG. 2) is driven by a drive roller 25 (in the direction of the arrow A) and is guided around a direction-changing roller 24 adjacent to the cutting blade 4 or the cutting space 8. The drive roller 25 is arranged at an outlet 28 of the conveyor passage 11 and in displaced relationship in respect of height with respect to the direction-changing roller 24 so that the lower conveyor belt 14 forms a rising underside of the conveyor passage 11 in the direction of conveying movement (arrow A, movement of the conveyor belt in the counterclockwise direction).

The upper conveyor belt 13 is driven (in the direction of the arrow B) by a drive roller 27 arranged in the region of the exit 28 of the conveyor passage 11 and is passed around a direction-changing roller 26 which is displaced in respect of height with respect to the drive roller 27 and which is arranged closer to the axis of rotation 5 of the cutting blade 4, with respect to the lower direction-changing roller 24.

Because of the reduction in cross-section of the conveyor passage 11 from the ejection opening 10 of the cutting space 8 to the exit 11, cuttings which have been cut off and which pass through the ejection opening 10 into the conveyor passage 11 are thus discharged in a pre-compacted condition to the compacting unit 15 at the exit 28 of the conveyor passage 11. The bulk volume of the cuttings which are supplied in loose form is pre-compacted by about 4:1. Provided in the side walls of the conveyor passage 11 are openings so that the air flow generated by the rotating cutting blade 4 in the cutting space 8 can issue laterally from the conveyor passage 11. The cutting blade 4 may have air vanes or blades (not shown) which in the cutting space 8 boost the air flow (circulation of air) which transports the cuttings to the cutting conveyor device 12.

Each conveyor belt 13, 14 can be in the form of a one-piece belt or in the form of a conveyor chain with individual chain members 30 (FIG. 2 and FIG. 4) which have upwardly and downwardly open half-shell portions 31 and 37 respectively at their oppositely disposed longitudinal sides. Each two adjacent chain members 30 are pivotably connected together by way of a pivot pin 32 which is inserted into the respectively interengaging half-shell portions 31, 37 of the two chain members 30. The chain member 30 is a rigid traction portion. It may have a fixing means in order to receive and secure a flexible elastic conveyor lip 33 which projects substantially perpendicularly to the direction of conveying movement. The fixing means may be in the form of at least one slot 34 for receiving co-operating portions 35 on the conveyor lip 33. In that way it is possible to combine chain members 30 and conveyor lips 33 involving different materials and material properties (such as for example hardness, flexibility). The conveyor lips 33 may however also be formed in one piece with the chain members 30 (or with another kind of conveyor belt). They extend substantially over the entire width of the chain members 30.

The conveyor chain is constructed alternately from chain members 30 with conveyor lips 33 and chain members 30 without conveyor lips 33. Alternatively a plurality of chain members 30 without conveyor lips 33 can be arranged between two chain members 30 which have conveyor lips 33. The lower conveyor belt 14 is separated from the ground or underlying soil by a cover 36 and protected thereby.

It is also possible for the conveyor chains used to be commercially available link or roller chains with plate-like conveyor elements which are secured thereto and which are oriented in the direction of conveying movement, with conveyor lips extending perpendicularly to the direction of conveying movement, or similar conveyor means.

To drive the conveyor belts or chains 13, 14 a chain or a V-belt 40 (FIG. 1) connects the mounting shaft of the cutting blade 4 to a worm gear transmission 41. An output shaft 42 of the worm transmission 41 is mounted in a lateral transmission housing 43 and by way of a single or duplex chain 44 (see FIG. 3) drives a chain wheel 45 which is fixed to a stub shaft portion 46, mounted in the transmission housing 43, of a compacting screw 47 of the compacting unit 15. Mounting shafts 49, 50 of the drive rollers 25 and 27 of the conveyor belts 14 and 13 respectively are driven by the shaft portion 46, by way of a single-row chain 48. The chain 48 can be tensioned by way of a tensioning roller 51. The mounting shaft 50 is in the form of a hollow shaft which is mounted rotatably (in a manner not shown) on the output shaft 42.

The chain wheel 45 of the compacting screw 47 is of a larger diameter than the output shaft 42 so that its speed of rotation is stepped down for the purposes of matching the rotary speed of the compacting screws 47 and 60.

The compacting unit 15 has a housing 55 (see FIG. 5) which comprises two half-shell housing portions 56, 57. The lower half-shell portion 56 is an integral component of the self-supporting housing 2 of the lawn mower 1. The upper half-shell portion 57 is fixed pivotably by means of a flap hinge 58 to the lower half-shell portion 56 and can be locked in the closed position. The housing 55 accommodates the compacting screw 47 (see FIG. 1) which at the input side is rotatably mounted by way of its shaft portion 46 (as described above) in the transmission housing 43 and is driven thereby. At the output side (at its end which is the leading end in the direction of conveying movment) it is rotatably mounted in the blade set 16 which is also arranged in the housing 55 and held in annular guide grooves 59. The compacting screw 47 can have an increasing pitch (axial spacing of the flights) (not shown) so that the cuttings are compacted by about 3:1.

The blade set 16 includes an apertured guide disk (not shown) in order to impart a substantially swirl-free axial movement to the cuttings which are moved with swirl by the compacting screw 47 in the direction of conveying movement. For that purpose, arranged around the center of the apertured guide disk are a plurality of openings which are formed in the manner of a passage which is inclined relative to the axis of rotation of the apertured guide disk. Arranged behind the apertured guide disk is a blade which rotates with the compacting screw 47. The cutting edges of the blade which for example has four blade arms bear against an apertured disk. The diameter of the holes or apertures in the apertured disk determines the counter-pressure against the cuttings being conveyed and the size of the pieces of cuttings which issue from the blade set 16. The blade set 16 may have a second blade with a second apertured disk in order still further to chop up the cuttings for breaking up the surfaces thereof.

The housing 55 further encloses the dehydration device 17. The latter includes, in a tapering portion of the housing 55, a tapered compacting screw 60 (FIG. 1) which is arranged coaxially with respect to the compacting screw 47 of the compacting unit 15 and which is non-rotatably connected thereto. It is rotatably mounted with its intake end 61 in the blade set 16 and with its outlet end 62 in an apertured disk 63 arranged on an outlet end portion 64 of the housing 55. The cutting blade 18 is non-rotatably mounted for joint rotation at the outlet end 62 of the compacting screw 60 which extends through the apertured disk 63. In the lower half-shell portion 56 of the housing 55 the dehydration device 17, in the region of the compacting screw 60, includes at least one opening 65 through which liquid pressed out of the moist cuttings can issue. The opening 65 includes a sieve in order to prevent chopped-up and compacted cuttings from escaping. The dehydrated cuttings are pressed through the openings in the apertured disk 63 and are then cut off by the rotating cutting blade 18 and distributed on the ground.

The expelled, nutrient-rich liquid flows through the opening or openings 65 into the drain channel 19 arranged beneath the housing 55. The drain channel 19 has a channel-shaped depression 66 with an elevated edge or web portion 67 upstream of the drain or discharge prongs 20. The expelled liquid collects in the depression 66. It can only drain away by way of the discharge prongs 20 when it exceeds a liquid level which is fixed by the height of the edge or web portion 67. The discharge prongs 20 have raised lateral walls 68 and a lower discharge 69 which tapers to a point and which in the mowing operation penetrates through the remaining grass vegetation to the ground so that the liquid is fed specifically and directedly to the ground and passes into the root region of the grass. That prevents the liquid being distributed only at the surface and remaining on the blades of grass without being able to contribute to ground fertilization.

In addition one or more openings can be arranged in the lower half-shell portion 56 of the housing 55 in the region of the compacting screw 47 (this is not shown) so that liquid which is already expelled in the operation of pre-compacting the cuttings (in the case of cuttings with a high moisture content) can issue into the discharge channel 19.

One or more spiral depressions (not shown) extending in parallel relationship can be provided on the inside of the two half-shell portions 56, 57 in the region of the two compacting screws 47, 60, with the pitch of those depressions being opposite to the pitch of the compacting screws 47, 60. That oppositely directed guidance effect improves compacting of the cuttings and the effect of breaking up the surface thereof.

A further embodiment of the mowing machine according to the invention is shown in FIG. 7. The hand lawn mower 70 substantially corresponds in terms of structure to the lawn mower 1 which is described with reference to FIG. 1, but it substantially differs therefrom in that, instead of the dehydration device 17, it has a return device 71 which transports the cuttings, after issuing from the blade set 16, to a cutting blade 72 which is in the form of a distribution member.

The return device 71 can be a driven conveyor belt which is arranged in a tube or passage and on which the cuttings which have been cut up small and which contain moisture or liquid are transported to the cutting blade 72. As is described hereinafter, the cutting blade 72 produces a suction effect in the passage of the conveyor belt, and that effect promotes the conveying action.

In the embodiment shown in FIG. 7 the return device 71 is a conveyor screw 73 which extends from a collecting space 74 of the housing 55 downstream of the blade set 16 into the proximity of the axis of rotation 5 of the cutting blade 72 (FIG. 9). The conveyor screw 73 is enclosed by a screw housing 75 which can be a tube or a part of the self-supporting housing 2. The drive for the conveyor screw 73 can be provided by means of a direction-changing transmission by the compacting screw 47, or it can engage the outlet end of the conveyor screw 73.

The conveyor outlet of the conveyor screw 73 is a downwardly directed, downwardly open tube portion 76. Arranged beneath the tube portion 76 is a cover disk 77 having an opening 79 positioned under an outlet 78 of the tube portion 76, for the conveyed cuttings to pass therethrough.

The cutting blade 72 has for example three blade arms 80 (see FIG. 8). The cutting blade 72 includes a central, substantially horizontal bottom portion 81 which extends from the axis of rotation 5 to each blade arm 80, a cranked transitional region 82 which radially adjoins the bottom portion 81 in an outward direction and which is inclined downwardly and which has an outlet opening 83, and an outer horizontal blade portion 84 which has a blade 85 at its leading edge in the direction of rotation and an air vane or blade 86 at the trailing edge. Each blade arm has a cover 87 by which a hollow space or conveyor passage 88 is formed.

The cuttings which are fed by way of the conveyor screw 73 and by way of the outlet 78 of the tube portion 76, in eccentric relationship with the axis of rotation 5, into a receiving chamber 89 of the cutting blade 72, which chamber is open at the top but covered by the cover disk 77, is flung radially outwardly by centrifugal force in the rotating conveyor passage 88 and diverted by the cranked configuration of the blade arm 80 (that is to say the downwardly curved cover 87) out of its radial movement into a substantially vertical movement with which it is 'shot' into the ground. The considerable acceleration forces which occur in that situation are sufficient for the cuttings to penetrate into the ground. Guide plates may additionally be arranged in the receiving chamber 89, to pass the cuttings to the conveyor passage 88 either directly or by producing an air flow.

The walls of the conveyor passage 88 may have a friction-reducing coating, for example a layer of TEFLON. That prevents moist cuttings from adhering to the surfaces, and it promotes a self-cleaning action for the guide surfaces.

The flow-promoting configuration of the blade arm 80 and possibly the air vanes or blades 86 arranged on the blade arm 80 produce an air flow which is directed upwardly at the outer edge region of the blade arm 80, that is to say in the cutting region, and downwardly in the region of the outlet openings 83. That promotes on the one hand the cuttability of the grass (by causing the grass to stand up) and on the other hand the vertical downward movement of the cuttings.

A drain channel (not shown) may be disposed beneath the housing 55, into which channel the liquid which has been expelled from the cuttings in the compacting unit 15 can be discharged through openings in the lower half-shell portion 56. The liquid is returned to the collecting space 74 which is at a lower level and transported with the cuttings to the distributing cutting blade 72 so that they can be used for fertilization purposes. The return can be meterable in order to set the residual moisture content in the cuttings, that is necessary for an optimum decomposition procedure.

A further embodiment of a cutting blade for distributing cuttings is shown in FIGS. 10 and 11. In the case of the cutting blade 90 which is shown by way of example with two blade arms 91, an outlet opening 92 is arranged at the outer end of the blade arm 91. By virtue of the greater radial distance from the axis of rotation 5, higher acceleration forces can be achieved with the cutting blade rotating at the same speed, so that the cuttings can penetrate even into relatively hard ground. Disposed symmetrically relative to the axis of rotation is a conical guide surface by which the vertically supplied cuttings are deflected radially into the guide passage.

A further example of a distribution device or distribution centrifuge for the cuttings is shown in FIGS. 13 through 15. The illustrated distribution device 100 is a separate component which is arranged coaxially with respect to the axis of rotation of a cutting blade (not shown) in the form of a conventional sickle blade and is mounted either on the drive shaft of a drive motor or directly on the cutting blade and rotates therewith. The distribution device 100 includes a central opening 101 at its top side for the feed of cuttings into a receiving chamber 102 from which for example four distribution blade arms 103 each having a respective conveyor passage 104 extend from the center outwardly. The conveyor passages 104 have downwardly bent guide wall portions 105 and open into outlet openings 106 so that the radially accelerated cuttings are deflected downwardly and issue from the distribution device 100 through the outlet openings 106 towards the ground. The cutting blade is arranged beneath the distribution device in displaced relationship in the peripheral direction between two respective blade arms 103, that is to say in displaced relationship through 45° relative to the blade arms 103 as shown in FIG. 13. FIGS. 15a through c show the cross-sections A—A, B—B and C—C in FIG. 13 to describe the configuration of the distribution device 100 and in particular the blade arms 103. The distribution device 100 which is in the form of a separate component is desirably made from plastic material, composite fiber material, light metal or alloy or the like. Its largest diameter is equal to or smaller than the diameter of the cutting blade.

Furthermore, a belt pulley can be mounted on the output shaft 42 of the worm transmission 41, by way of which pulley a drive belt drives a wheel axle for a travel drive for the lawn mower 1, 70.

By virtue of the direct coupling of the cutting blade to the compacting unit, the cutting blade stops, when the drive motor or engine is switched off, within a very short period of time, by virtue of the frictional resistance of the compacting screw 47 in the compacting unit 15 (no run-on). That design configuration enhances the accident safeguard factor of the lawn mower (European safety regulations require suitable measures).

The substantially mechanical conveying of the grass by the two conveyor belts 13, 14 in the cuttings conveyor device 12 requires a lower level of power than would be necessary for producing a sufficiently strong air flow which would 'blow' or transport the grass into a grass catch basket. The reduction in power and the reduction in the air flow generated also affords a marked reduction in noise. The moving conveyor belts 13 and 14, with the conveyor lips 33, which delimit the conveyor passage 11 at both sides (top and bottom) permit optimum transportation of the individual loose blades of grass of the cuttings, which can be only incompletely transported by a single transport belt. The conveyor chains are self-cleaning as residues of cuttings are flung off the conveyor chain at the direction-changing rollers. That is promoted by the flexibility of the conveyor lips 33 which are partially bent by housing portions so that nonetheless cuttings which are firmly disposed thereon can be loosened.

In the above-described lawn mowers, the drive power is adjustable by way of a transmission, preferably a steplessly variable transmission, in dependence on the moisture content of the grass (or generally the strength and the cutting resistance of the cuttings), in order to provide for adaptation to the different power requirements of the compacting and the juice-removing unit (dehydration device) (reduction in drive power). At the same time the travel speed of the lawn mower can be regulated by way of the transmission.

The blade set 16 is particularly compact and space-saving but it is also possible to use a chaff cutter-like chopper in order to finely cut up the cuttings.

In accordance with a further embodiment of the invention (not shown) a plurality of mowing machines without their own travel chassis structure can be integrated into a common support frame which has a chassis structure with its own drive or is pulled along by a towing vehicle or tractor. In that way it is possible to achieve larger mowing widths in one working operation, with standard mowing machines which are combined together.

A further example of a lawn mower according to the invention is shown in FIG. 16. This mower for example is in the form of a self-propelled sit-on lawn mower which is possibly provided with a driving seat. The mowing mechanism 110 has two conventional sickle blades 112 which are arranged adjacent to each other under a common mowing bell 111 and which run one within the other and which rotate in opposite synchronized relationship, by way of a common drive. Synchronization or positive control can be achieved by way of a bevel gear assembly which couples together the two drive shafts of the two blades 112. The cuttings are fed by way of a central discharge or ejection means 113 at the middle, to a conveyor device 114 which, in a manner corresponding to the conveyor device described with the above-discussed examples, can be constructed with an upper and a lower conveyor belt or, in a simplified design configuration, with only a lower conveyor belt. The cuttings are transported by the conveyor device 114 into a compacting and chopping device 115 which is designed in accordance with the compacting unit also already described above, and is driven by way of a screw transmission 116 driven by a drive motor, and a chain transmission 117 coupled to the transmission 116. The cuttings then pass into a distribution device 118 which can be in the form of a distribution centrifuge the same as or similar to that shown in FIGS. 13 to 15. The diameter of the distribution centrifuge 118 and its speed of rotation can be adapted to the cutting width of the mowing mechanism 110. By virtue of the illustrated inclined positioning of the entire mowing mechanism 110 on the chassis the distribution device 110 can be arranged approximately centrally on the sit-on mower.

In accordance with this mowing mechanism of FIG. 16 with two (or also a plurality of) cutting members or sickle blades which are arranged in mutually juxtaposed relationship, the mowing machines already described above can also be equipped with two or more cutting members. Thus for example the mowing machine shown in FIG. 7 may have two cutting members by which the cuttings are transported to two compacting units and by way of respective return conveyor devices back again to the distribution device at each cutting member.

FIG. 17 shows an embodiment of a cuttings processing apparatus using the distribution device or distribution centrifuge according to the invention. A tractor vehicle 120 has in its front region a mowing apparatus (not shown). An apparatus for immediately processing the cuttings which lie on the ground can be mounted behind the tractor 120 on a conventional three-point suspension mounting of the tractor 120. The whole apparatus is fitted into a tube frame structure 121 which is provided with standardized mounting points 122 for mounting to the three-point suspension mounting arrangement of the tractor 120. The apparatus includes a sweeper brush 123 with which the cuttings are picked up from the ground and fed to a conveyor device 124 having an upper and a lower conveyor belt 125 and 126 respectively (designed for example in accordance with the description of the first embodiment) which pass the cuttings to a compacting unit 127 (also to be referred to as a grass shredder). Coming from the compacting unit 127, the cuttings are chopped up and transported to one or more juxtaposed distribution centrifuges 128 (of a design configuration corresponding to the distribution device shown in FIGS. 13 through 15), which feeds or feed the cuttings to the ground in an accelerated mode in the manner already described above. The drive for the individual components is provided by way of a driven take-off shaft 129 of the tractor 120 and by way of transmission arrangements 130 which are only symbolically illustrated.

FIGS. 18 and 19 show a mowing vehicle for roadside greenery (edge and central strips with grass growing thereon, and the like), which has components as already described hereinbefore. The vehicle 140 (see FIG. 18) includes a mowing mechanism 141 which can be moved into a mowing position with a holding arrangement (not shown). The cut-off cuttings are fed by way of a connecting hose 142 and a suction fan 143 to a foreign body separation arrangement 144 in which for example stones and the like are removed from the cuttings. A conveyor device 145 (for example with two conveyor belts as already described above) passes the cuttings to a compacting unit 146 (grass shredder). At the discharge of the compacting unit 146 a distribution device 147 receives the cuttings (the mash) and distributes it uniformly in a loading space 148 of the vehicle 140, in order to make optimum use of the available space. The drive for the entire apparatus is by way of a take-off shaft from the drive of the vehicle 140 or by way of a separate drive motor or engine.

This mowing vehicle affords the advantage that the volume of the cuttings is considerably reduced. Therefore the period of operation of the mowing vehicle can be prolonged by a quadruple, which results in a reduction in cost in operation of the mowing vehicle, by virtue of fewer starts and stops. A further advantage is that the cuttings or the grass cuttings are prepared in the best possible fashion for composting by virtue of the cell structure thereof being broken up, and that results in a shorter residence time in a composting installation.

A modified embodiment of the mowing vehicle as just described above is shown in FIG. 19. This mowing vehicle is of a similar structure but has a distribution device in the form of a distribution centrifuge 150 which is of a comparable structure to the distribution centrifuge shown in FIGS. 13 through 15. The distribution centrifuge 150 is fixed to a holding arrangement 151 on the mowing mechanism 141 and is thus movable therewith. The driven distribution centrifuge 150 rotates about a perpendicular axis and distributes the cuttings supplied thereto by the compacting unit 146 by way of a fan 152 and a connecting hose 153, directly behind the mowing mechanism 141. In that way the cuttings can be applied to the green surface again as fertilizer.

We claim:

1. Apparatus for processing cuttings produced in a mowing operation comprising:
   a cuttings conveyor device for transporting the cuttings into a compacting device,
   a chopping device for chopping up the cuttings,
   a distribution device for returning the chopped cuttings to the ground, the distribution device mounted rotatably and drivable about a substantially perpendicular axis of rotation, receiving the chopped cuttings from the chopping device, and returning the chopped cuttings, in an accelerated manner, towards the ground, and
   a return device which returns the chopped cuttings from the chopping device to the distribution device.

2. Apparatus as defined in claim 1 wherein said apparatus is integrated in a mowing machine having a driven rotating cutting member.

3. Apparatus as defined in claim 1 wherein the distribution device has a cuttings material receiving chamber and a distribution opening for returning the chopped cuttings, in said accelerated manner, towards the ground.

4. Apparatus as defined in claim 3 wherein the cuttings material receiving chamber is closer to the axis of rotation than the distribution opening.

5. Apparatus as defined in claim 3 wherein said distribution device has a hollow passage which connects the receiving chamber to the distribution opening.

6. Apparatus as defined in claim 5 wherein the receiving chamber has a guide surface for guiding the cuttings into the hollow passage.

7. Apparatus as defined in claim 3 wherein the distribution device has at least two distribution blade members with respective distribution openings.

8. Apparatus as defined in claim 5 wherein the hollow passage has a guide surface for guiding the cuttings downwardly.

9. Apparatus as defined in claim 3 wherein said distribution device is one of an integral part of a cutting blade, mounted on the cutting blade and coupled to the cutting blade.

* * * * *